Figure 1:
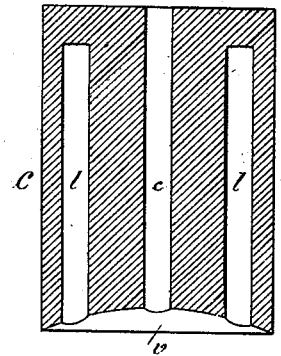

(No Model.)

F. AUCHMAN.
BLASTING POWDER.

No. 483,125.      Patented Sept. 27, 1892.

Witnesses
Eustace F. Hopkins.
Wilhelm Vogt

Inventor
Ferdinand Auchman.
by Edwin A. Pryden
Attorney.

UNITED STATES PATENT OFFICE.

FERDINAND AUCHMAN, OF GRAZ, AUSTRIA-HUNGARY, ASSIGNOR TO ANTON MOSCHEK AND AUGUST BRUNNER, BOTH OF SAME PLACE.

BLASTING-POWDER.

SPECIFICATION forming part of Letters Patent No. 483,125, dated September 27, 1892.

Application filed May 12, 1891. Serial No. 392,505. (No specimens.)

*To all whom it may concern:*

Be it known that I, FERDINAND AUCHMAN, of Graz, in the Empire of Austria-Hungary, have invented certain new and useful Improvements in Smokeless Blasting Compounds, of which the following is a full and clear specification.

This invention relates to an improved smokeless blasting compound, the principal ingredient of the same being malt germs or cooms.

My improved blasting compound consists of malt germs or cooms, nitrate of ammonia, and chlorate of potash. The malt germs or cooms, which have never been employed for any similar purpose, can be desiccated or can be used in undesiccated condition or can be used in dried or stuped condition.

Nitrate of ammonia and chlorate of potash can be used in solid or dissolved form or can be so employed that the material for producing the salts in question can be mixed and converted into nitrate of ammonia or chlorate of potash in the blasting material.

The manufacture of the improved blasting compound can be carried out in wet, dry, warm, or cold manner, as may be desired. Other indifferent ingredients can also be added to the mixture for coloring purposes—such, for instance, as aniline dissolved in alcohol, glycerine, or any other appropriate matter.

The following proportions have proved advantageous, although I wish it to be understood that I by no means restrict myself to the special proportions given below, as these can be varied according to requirements: about sixty per cent. of malt germs or cooms, fifteen per cent. nitrate of ammonia, and twenty-five per cent. chlorate of potash.

The simplest method of producing the improved blasting compound is by mixing the powdered or dissolved ingredients with the dissolved coloring-matter or water. The addition of the latter should be so made that it is not necessary to dry the mixture preparatory to use.

If the malt germs or cooms are mixed with nitrate of ammonia without the addition of chlorate of potash, or vice versa, a blasting compound will also be produced which can be fired by the ordinary blasting-caps, whereas when the complete compound of malt germs or cooms, nitrate of ammonia, and chlorate of potash is used the same can be exploded by a quick-match, by means of electricity, or in other desired manner.

One great advantage of this blasting compound is that by modifying the proportion of the ingredients any desired degree of explosive force can be attained.

For use in mines and other blasting purposes and rendering the compound as smokeless as possible about the following proportions can be employed: malt germs or cooms, forty to seventy per cent.; nitrate of ammonia, forty to ten per cent.; chlorate of potash, twenty to forty per cent.; or malt germs or cooms, thirty to seventy per cent.; nitrate of ammonia, sixty to thirty per cent.; or malt germs or cooms, forty to seventy per cent.; chlorate of potash, sixty to thirty per cent.

Figure 2:
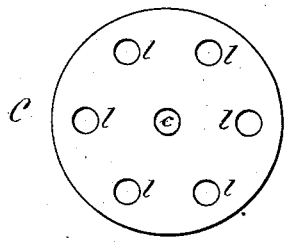

I prefer to give the cartridges the form of a cylinder C, of which Figure 1 is a vertical section and Fig. 2 a top view or plan, and provide the same with a central boring or canal $c$ for the match and with air-channels $l\,l$, said cylinder being also recessed at $v$ to form an air-chamber.

Having now particularly described and ascertained the nature of my said invention and the manner in which the same is to be performed, I declare that what I claim is—

As a new article of manufacture, a blasting compound consisting of malt germs or cooms, nitrate of ammonia, and chlorate of potash, substantially as described.

In witness whereof I hereunto set my hand in presence of two witnesses.

FERDINAND AUCHMAN.

Witnesses:
W. B. MURPHY,
A. SCHLESSING.